US012085927B2

(12) United States Patent
Grießinger et al.

(10) Patent No.: US 12,085,927 B2
(45) Date of Patent: Sep. 10, 2024

(54) COMPUTER PROGRAM PRODUCT, INDUSTRIAL INSTALLATION, METHOD AND APPARATUS FOR DETERMINING OR PREDICTING A POSITION OF A WEB BREAK

(71) Applicants: Siemens Aktiengesellschaft, Munich (DE); Siemens Energy Global GmbH & Co. KG, Munich (DE)

(72) Inventors: Konrad Moritz Grießinger, Karlsruhe (DE); Sarah Osterburg, Berlin (DE)

(73) Assignees: SIEMENS AKTIENGESELLSCHAFT, Munich (DE); SIEMENS ENERGY GLOBAL GMBH & CO. KG, Munich (DE)

( * ) Notice: Subject to any disclaimer, the term of this patent is extended or adjusted under 35 U.S.C. 154(b) by 296 days.

(21) Appl. No.: 17/433,280

(22) PCT Filed: Feb. 24, 2020

(86) PCT No.: PCT/EP2020/054783
§ 371 (c)(1),
(2) Date: Aug. 24, 2021

(87) PCT Pub. No.: WO2020/173880
PCT Pub. Date: Sep. 3, 2020

(65) Prior Publication Data
US 2022/0147033 A1  May 12, 2022

(30) Foreign Application Priority Data
Feb. 25, 2019 (EP) .................................... 19159055

(51) Int. Cl.
*D21F 7/04* (2006.01)
*B65H 26/02* (2006.01)
*G05B 23/02* (2006.01)

(52) U.S. Cl.
CPC ....... *G05B 23/0221* (2013.01); *B65H 26/025* (2013.01); *D21F 7/04* (2013.01); *G05B 23/0272* (2013.01)

(58) Field of Classification Search
CPC ....... B65H 26/025; D21F 7/04; G05B 19/406; G05B 23/0221; G05B 23/0272

USPC ........................................................ 162/255
See application file for complete search history.

(56) References Cited

U.S. PATENT DOCUMENTS

| 6,543,353 B1 | 4/2003 | Ohlhauser et al. | |
|---|---|---|---|
| 2004/0263166 A1 | 12/2004 | Kluge | |
| 2007/0045461 A1 | 3/2007 | Sartain et al. | |
| 2012/0078576 A1* | 3/2012 | Starkl | B65H 26/02 702/182 |
| 2012/0193464 A1* | 8/2012 | Sartain | B65H 26/025 242/534.1 |
| 2014/0211213 A1 | 7/2014 | Weiss | |
| 2021/0115626 A1 | 4/2021 | Arnason et al. | |

FOREIGN PATENT DOCUMENTS

| CN | 1539373 | 10/2004 |
|---|---|---|
| CN | 103782150 A | 5/2014 |
| DE | 112007002607 | 12/2009 |
| DE | 102009022962 | 12/2010 |
| EP | 1832417 | 9/2007 |
| EP | 3392405 | 10/2018 |
| WO | WO 2008/059105 | 5/2008 |

OTHER PUBLICATIONS

PCT International Search Report dated Jun. 9, 2020 based on PCT/EP2020/054783 filed Feb. 24, 2020.
EP Search Report dated Aug. 19, 2019 based on EP19159055 filed Feb. 25, 2019.

* cited by examiner

*Primary Examiner* — Dennis R Cordray
(74) *Attorney, Agent, or Firm* — Cozen O'Connor

(57) ABSTRACT

A computer program product, an industrial installation in particular a paper-making machine, an apparatus and method for predicting a position of a web break of a fibrous material web that has occurred or is imminent, wherein the method includes capturing parameters, in particular speeds of rollers for transporting the fibrous material web or a web tension thereof, where the parameters are advantageously stored in the form of time series, a self-learning algorithm is used to detect the imminent web break and to determine the position of the web break which is imminent and/or has occurred, where the basis for the detection or the determination is a deviation of the respective parameter, such as from a temporal mean of the respective parameter.

17 Claims, 4 Drawing Sheets

FIG 5
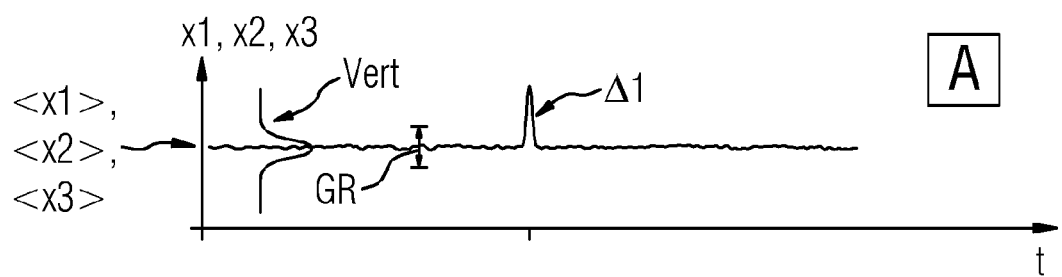
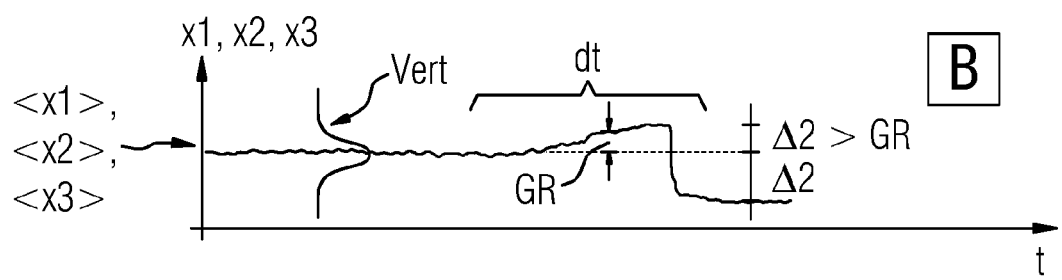
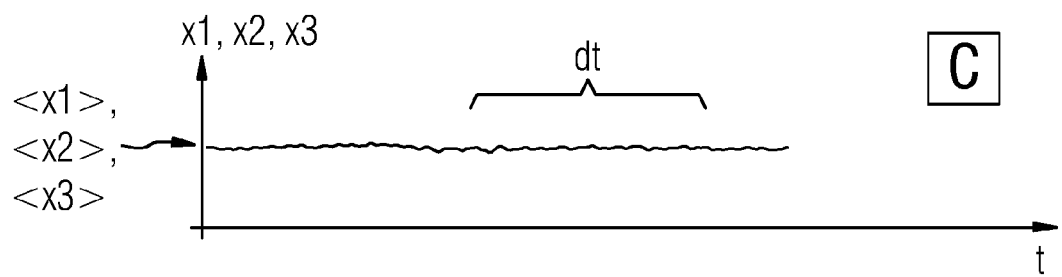

COMPUTER PROGRAM PRODUCT, INDUSTRIAL INSTALLATION, METHOD AND APPARATUS FOR DETERMINING OR PREDICTING A POSITION OF A WEB BREAK

CROSS-REFERENCE TO RELATED APPLICATIONS

This is a U.S. national stage of application No. PCT/EP2020/054783 filed 24 Feb. 2020. Priority is claimed on European Application No. 19159055.3 filed 25 Feb. 2019, the content of which is incorporated herein by reference in its entirety.

BACKGROUND OF THE INVENTION

1. Field of the Invention

The invention relates to a computer program product, an industrial installation, a method and an apparatus, in particular, for determining and predicting a position of a web break of a fibrous material web that has taken place or is imminent.

2. Description of the Related Art

Industrial installations for producing and/or processing a fibrous material web are, for example, paper-making machines or printing machines. In the production or processing of the fibrous material web, a tear of the fibrous material web, a "web break", occurs from time to time.

Following a web break, the industrial installation must typically be stopped and serviced.

In order to keep the time for the standstill of the industrial installation as low as possible, it is advantageous to know the position of the web break in the industrial installation.

It also appears to be advantageous that such web breaks do not occur at all.

SUMMARY OF THE INVENTION

Accordingly, it is an object of the invention to prevent or at least to reduce stoppage times in an industrial installation.

This and other objects and advantages are achieved in accordance with the invention by a computer program product, an industrial installation, an apparatus and a method which serves, in particular, for determining and predicting a position of a web break of a fibrous material web that has occurred or is imminent in an industrial installation, wherein the industrial installation has a plurality of rollers, where the rollers are provided to transport the fibrous material web in the industrial installation, and where the method includes at least the following first steps comprising:

providing and optionally storing parameters, where each parameter is associated with at least one roller;
performing a check to determine whether a parameter corresponds in its temporal progression to a specifiable distribution, in particular, a normal distribution;
if the temporal progression of the respective parameter corresponds to the specifiable distribution, then a further parameter is checked for the distribution;
if the temporal progression of the further parameter does not correspond to the specifiable distribution, then a check of the temporal progression for a first deviation occurs.

Advantageously, in the context of the method, the parameters are checked for a difference from the specifiable distribution. Advantageously, each parameter is periodically checked for a difference with regard to the specifiable distribution.

The parameters are advantageously determined by a sensor or a detector. The parameters can also be provided by a control device for each respective motor.

Advantageously, the parameters are stored in a data store as a time series. The data store can be provided locally or can be associated with a decentralized computer unit, such as a cloud.

Advantageously, parameters are determined that form a (rotary) movement of a roller. For example, one parameter is the rotary speed of the respective roller, the torque that the motor must apply to turn the roller and/or a position of the respective roller, provided the roller is displaceable in its position. The parameters are advantageously each stored as time series.

The specifiable distribution can be a Gaussian distribution or another statistical normal distribution.

In accordance with the method of the invention, the parameters are advantageously each stored with a time stamp. With the respective time stamp, the parameters can be compared with one another as time series.

Typically, the respective parameter, such as a rotary speed or a torque of a motor is encumbered with noise. Noise means that the value of the respective parameter varies as a function of time. However, the variation is such that the values vary about a mean value in accordance with a normal distribution, in particular, a Gaussian distribution. Therefore, a check of whether the variation of the respective parameter remains within the scope of the distribution occurs.

Advantageously, all the parameters provided are checked for a specifiable distribution. With the distribution, it is possible to determine whether the variation occurs due to an imminent or completed web break or whether it is a "normal" variation within the scope of a specifiable distribution.

If the parameter, in particular, the temporal progression of the parameter deviates from the specifiable distribution, then the parameter is further investigated for a first deviation.

The parameter, the temporal variation of which does not behave according to a specifiable distribution, can be investigated for a second deviation. A second deviation is, for example, a peak in the temporal progression of the respective parameter. Herein, the temporal progression of the respective parameter can be investigated with regard to a second deviation of the parameter from its temporal mean. Alternatively or additionally, a first deviation can be a changed difference between two parameters in each case. In particular, an investigation of a temporal change of the respective parameter occurs.

Advantageously, upon detection of a deviation of a parameter, an allocation to the roller with which the respective parameter is associated occurs. Through the determination of the roller, the position of the web break in the industrial installation can be quickly and reliably ascertained from the position of the respectively determined roller.

An imminent or completed web break can be concluded if the first deviation exceeds a limit value.

With the aid of the method in accordance with the invention, a large number of parameters can be investigated for a deviation in a particularly efficient manner. Thus, in the case of a web break of the fibrous material web, the position of the web break can be determined quickly and reliably.

Advantageously, the method in accordance with the invention is implemented during the operation of the industrial installation and checks the determined parameters at least irregularly. Thus, the first deviation of a parameter can be determined quickly and reliably. The recognized first deviation advantageously forms the basis for the detection of an imminent web break in the industrial installation.

In an advantageous embodiment of the invention, the method comprises the following two steps:
  determining a second deviation of at least one parameter or a temporal change of the respective parameter;
  comparing the respective parameter and/or the respective temporal change of the respective parameter with a specifiable limit value in each case;
  IN accordance with the contemplated embodiment, the second deviation is recognized and/or the second deviation is associated with at least one roller for the web break of the fibrous material web that is imminent or has occurred with the aid of a learning-capable algorithm.

Advantageously, the first and second steps occur for determining a position of a web break that is imminent or has taken place.

Advantageously, the respective parameter is investigated for a first deviation, where the respective parameter has not necessarily been found to be significant for determining a position of a web break via a comparison with a specifiable distribution.

Accordingly, a second deviation can also be a deviation of the respective parameter beyond the usual variation of the respective parameter.

A second deviation is, for example, a deviation of the respective parameter from a temporal mean of the respective parameter beyond a small variation range of the parameter. Furthermore, a criterion for a first and a second deviation can be that the respective parameter shows the deviation from the temporal mean of the respective parameter for at least a duration. Such a duration preferably lasts for 1 millisecond to 1 second.

A limit value serves for deciding whether a parameter has a deviation from a temporal mean. The limit value can be 1% to 10% of the respective parameter.

Upon exceeding the parameter beyond the duration, a second deviation of the respective parameter can be acquired.

A roller of the industrial installation is usually associated with one parameter. As a rule, the position of the respective roller in the industrial installation is known. As a result, an allocation of a web break of the fibrous material web that is imminent or has occurred can take place quickly and reliably.

Advantageously, the detection of the second deviation occurred with the aid of a learning-capable algorithm. Preferably, the first deviation can also be detected with the aid of a learning-capable algorithm.

Preferably, the learning-capable algorithm can provide the duration that a deviation lasts in order not to be classified as a random deviation/noise. Alternatively or additionally, the specifiable distribution can be adapted with the aid of the learning-capable algorithm.

The learning-capable algorithm is advantageously taught with the aid of the respectively provided parameters, the respectively determined deviation and with the aid of information from web breaks that have occurred.

A neural network, a support vector machine or another algorithm based upon artificial intelligence (KI), in particular, a random forest tree, is suitable as a learning-capable algorithm. Advantageously, both monitored and also non-monitored learning-capable algorithms are provided.

The self-learning algorithm is preferably configured to discover abnormalities in the respective parameter that differ from the normal operation of the industrial installation.

Advantageously, time series of the respective parameters are provided to the self-learning algorithm. Based on the time series, the self-learning algorithm determines first deviations and/or second deviations. The respective behavior of the respective roller is associated with the respective deviations of the parameters.

In particular, with the aid of the self-learning algorithm, a method of this type can act largely independently, so that an operator of the industrial installation can be unburdened.

In a further advantageous embodiment of the invention, the first deviation of the respective parameter is determined with the first steps and the second deviation is determined with the aid of the second steps, where with the aid of the first deviation, a first position of the web break that is imminent or has occurred is determined and where with the aid of the second deviation, a second position of the web break that is imminent or has occurred is determined, and where if the first position and the second position match, then the respective position is shown to a user.

Advantageously, the sequence of the first and second method steps occurs based on the same parameters. Advantageously, the first steps occur in a first part of a computer program and the second steps occur in a second part of the computer program.

If the first and second steps each determine different rollers or a different position of a web break that is imminent or has occured, then the actual position of the web break can be provided to the self-learning algorithm. The provision occurs with the aim of improving the teaching of the self-learning algorithm.

Through the improved learning-capable algorithm, different positions of the web break can be reduced.

If the position of the web break of the fibrous material web that is imminent or has taken place matches, then this position can be displayed to the operator of the industrial installation.

In a further advantageous embodiment of the invention, if the first position and the second position of a web break that is imminent or has occurred is different, then a determination of the position of the web break occurs, preferably with the aid of a visual monitoring, where the determined position of the web break that has occurred is provided to the learning-capable algorithm, so that the learning-capable algorithm is improved based on the position of the web break that has occurred.

Visual monitoring can occur with the aid of one or more camera modules or other sensors that are directed to the fibrous material web.

Alternatively or additionally, visual monitoring can be performed by an operator.

The position of the web break determined through the visual monitoring is advantageously provided to the self-learning algorithm to improve a determination of the position of a web break that is imminent or has occurred. In particular, the advantageous size of a limit value for a first and/or second deviation can be improved.

Through the feedback of the information of the visually determined position of the web break, the self-learning algorithm can be improved.

In a further advantageous embodiment of the invention, the parameters, the determined position of the web break that has occurred and/or the respectively determined first and/or second deviation are provided to the learning-capable algorithm. Advantageously, all the parameters are provided to the self-learning algorithm in the form of time series. Preferably, only those parameters that do not correspond to the specifiable distribution are provided to the self-learning algorithm.

Advantageously, the parameters that do not correspond to the specifiable distribution are provided to the self-learning algorithm as time series.

With the comparison of the respective parameters and the information of the respective web break with the parameters, the learning-capable algorithm can be taught quickly and efficiently. With an efficiently taught algorithm, a quick and reliable determination of the position of the web break that is imminent or has occurred can be performed.

In a further advantageous embodiment of the invention, for ascertaining an imminent web break, the first steps and/or the second steps are run through repeatedly, in particular periodically. In particular, in order to detect an imminent web break of the fibrous material web during the operation of the industrial installation, the determined and provided parameters are advantageously investigated continuously with the aid of the first and/or second steps.

Advantageously, all the parameters are repeatedly investigated for the specifiable distribution. Advantageously, an investigation of the parameters occurs with the aid of the first and second steps.

Preferably, the first and/or second steps are performed repeatedly periodically, provided the industrial installation is in operation.

With the continuous monitoring of the respective parameter, an imminent web break can be effectively detected.

In the case of a web break that has already occurred, via the subsequent analysis of the parameters, an exact position of the web break can be determined.

In a further advantageous embodiment of the invention, for ascertaining the position of a web break that has occurred, the first steps and/or the second steps are implemented after the web break has occurred.

Alternatively or additionally to the monitoring performed during the operating time of the industrial installation, upon a web break, a separate investigation of the parameters in a time region before the web break occurs. The separate investigation occurs with the first and/or second steps.

Advantageously, with a precise investigation after a web break has occurred, the efficiency of the self-learning algorithm can be enhanced.

In a further advantageous embodiment of the invention, the respectively saved parameters are investigated in a time region for a first deviation, where the time region is arranged immediately before the web break that has taken place. The time region can be 1 to 10 minutes.

Advantageously, an investigation of the parameters occurs in a time region, where the end of the time region advantageously coincides with the web break.

The investigation preferably occurs with first steps and/or with second steps. The first and second steps can both run in parallel.

With an investigation of the respective parameter, solely in the time region before the web break occurred, computational effort is advantageously spared.

In a further advantageous embodiment of the invention, the deviation of the respective parameter is determined based on a difference of the respective parameter from a respective temporal mean of the respective parameter.

A temporal mean of the respective parameter can be determined because the parameter is integrated over the operating time and then divided by the operating time.

Typically, a parameter, such as a rotary speed of a roller, is largely constant during the operation of the industrial installation. A deviation from the constant value that is determinable by its temporal mean thus indicates an imminent web break. A deviation can also be established by the change of the paper type and/or a change of the operating mode of the industrial installation. This should be taken into account in the context of the disclosed described embodiments of the method.

Where relevant, a plurality of parameters increase together. For example, respective adjacent rollers can assume a higher rotary speed together without increasing the risk of a web break between the rollers. Such a problem can be prevented by means of an observation of the web tension as a parameter.

Through the observation of the deviation of the respective parameter from its temporal mean, an error function of a roller or an associated drive can be quickly and easily determined.

In a further advantageous embodiment of the invention, the respective parameter is associated with a plurality of rollers, where the respective parameter maps the movement of respective adjacent rollers.

Such a parameter can be a web tension of the fibrous material web between two adjacent rollers. The web tension can be proportional to a difference between the rotary speeds of the respective adjacent rollers.

Through the observation of parameters that define, for example, a difference in the movement of rollers, deviations can be determined particularly easily.

In a further advantageous embodiment of the invention, a teaching of the learning-capable algorithm occurs based on a comparison of the respective parameter in a time region before a web break has occurred with the respective parameter in a time region during a normal operation of the industrial installation.

In the presently contemplated embodiment, the distribution and/or the temporal mean of the respective parameter is advantageously determined during the normal operation of the industrial installation.

In order to improve the method, the temporal progression of the respective parameter in the time region before the web break can be compared with the temporal mean.

With this embodiment, a quick and efficient teaching of the learning-capable algorithm occurs.

In a further advantageous embodiment of the invention, the respective parameter is:
  a rotary speed or a torque of the respective roller or of a motor that is coupled to the respective roller;
  a web tension of the fibrous material web between a first roller and a second roller;
  a difference in the rotary speeds of two rollers;
  a supply current or the frequency of the supply current of the motor that is coupled to the respective roller; or
  a regulating parameter for the respective motor.

Advantageously, rollers are observed that are respectively adjacent in the context of the transport of the fibrous material web.

The web tension can be determined from the difference of the rotary speeds of the respective rollers between which the web tension is to be determined.

Preferably, the web tension is additionally determined with the aid of a tension load cell, where the tension load cell is configured as a sensor for the web tension of the fibrous material web.

In a further advantageous embodiment of the invention, the second deviation is determined solely after the web break has occurred, where the first deviation is determined repeatedly, preferably periodically.

A first deviation preferably serves for determining short-term deviations of the respective parameter from its temporal mean. A first deviation does not necessarily lead to a web break. A first deviation of a parameter from the temporal mean can, however, increase the likelihood of a web break. Thus, the first steps for determining the first deviation occur during the operation of the industrial installation. A determination of the second deviation advantageously occurs to predict an imminent web break.

The determination of the second deviation preferably serves for determining a longer deviation of the respective parameter from its temporal mean. Second deviations are often an indicator of a web break. By ascertaining the second deviation in a parameter, based on the parameter, the roller with which the parameter is associated can be determined. Based on the position of the corresponding roller in the industrial installation, the position of the web break can easily be determined.

In a further advantageous embodiment of the invention, at least one first roller is associated with a first group, where at least one second roller is associated with a second group, where a first and/or second deviation of the parameter of the at least one roller is determined;

where a first and/or second deviation of the parameter of the at least one second roller is determined; and/or where a first and/or second deviation of the parameter of the at least one first roller from the at least one second roller is determined.

Preferably, rollers of a drying unit are combined into a group. The rollers in the respective group often have a substantially equal rotary speed or a substantially equal torque.

Typically, web breaks of the fibrous material web occur at sites that lie outside the respective groups of rollers. With regard to a paper-making machine, a group advantageously represents a drying section, in which the fibrous material web pass through a plurality of such drying sections until a winding apparatus winds the fibrous material web onto a roller.

Advantageously, the rollers are combined as a group whereby in a first passage through the first steps and/or the second steps, the group of rollers is treated as a single roller, i.e., a parameter is associated with the respective group.

The combining of the rollers into groups, where the rollers in the respective group show a substantially identical behavior, significantly reduces the effort for determining first and second deviations.

It is also an object of the invention to provide an apparatus which serves, in particular, for determining a web break of a fibrous material web that has taken place or is imminent in an industrial installation. The apparatus comprises:

at least one acquirer for acquiring parameters, where a respective parameter serves to define the movement of at least one roller;

a display for displaying the web break that has occurred or is imminent;

In accordance with the invention, the apparatus is associated with a computer unit, where the computer unit is configurable for determining the position of a web break that has occurred or is imminent, with the aid of a method in accordance with the disclosed embodiments.

The apparatus is advantageously configured as a control facility for an industrial installation, in particular, for a part of a paper-making machine.

The acquirer for acquiring a parameter is configured, for example, as a sensor for determining a torque, a detector for determining a rotary speed, a sensor for determining a web tension of the fibrous material web, in particular as a tension load cell.

Alternatively or additionally, the acquirer can be an interface for acquiring a rotary speed, where the interface is associated with a power supply of the respective motor.

Furthermore, the interface can be a sensor for a voltage or a current that is provided to the respective motor.

The display can be configured as a screen, where the screen is preferably associated with a control station.

The display is advantageously connected to the computer unit, where the computer unit is configured to implement the first and/or the second steps. The computer unit can be configured as an edge device or as a decentralized server.

Advantageously, a display of an image of the industrial installation takes place, where the rollers and their position are identified. Through the identification of the respective roller or the respective rollers at or between which the web break has occurred or is imminent, the position of the web break that has occurred or is imminent can be determined at a glance.

The computer program product is provided to run on a computer unit, where the computer program product is configured to run on a computer unit for implementing the method in accordance with the disclosed embodiments of the invention.

The computer program product is advantageously transferrable to a memory store of a computer unit and from there is executable with the aid of at least one CPU. The computer program product is advantageously storable in a data store such as a USB stick, a hard disk drive or a CD-ROM/DVD-ROM and is accessible or installable from there on the computer unit.

The computer program advantageously has at least one input interface for the respective parameter. The computer program product advantageously further comprises output interfaces for providing the position of the web break that has occurred or is imminent.

Furthermore, the computer program advantageously comprises an interface for connecting to a data store for storing the parameters and/or for reading in the respective parameters. The parameters are advantageously stored in a database.

The industrial installation is preferably configured as a drying section of a paper-making machine or as a paper-making machine. The industrial installation advantageously comprises an apparatus according to the above description.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described and explained in greater detail making reference to the drawings. The features shown in the drawings can be combined into new embodiments of the invention. The embodiments illustrated in the drawings are merely exemplary and in no way restrict the invention in which:

FIG. 5 shows graphical plots of time series of parameters in accordance with the invention.

DETAILED DESCRIPTION OF THE EXEMPLARY EMBODIMENTS

Figure 1:
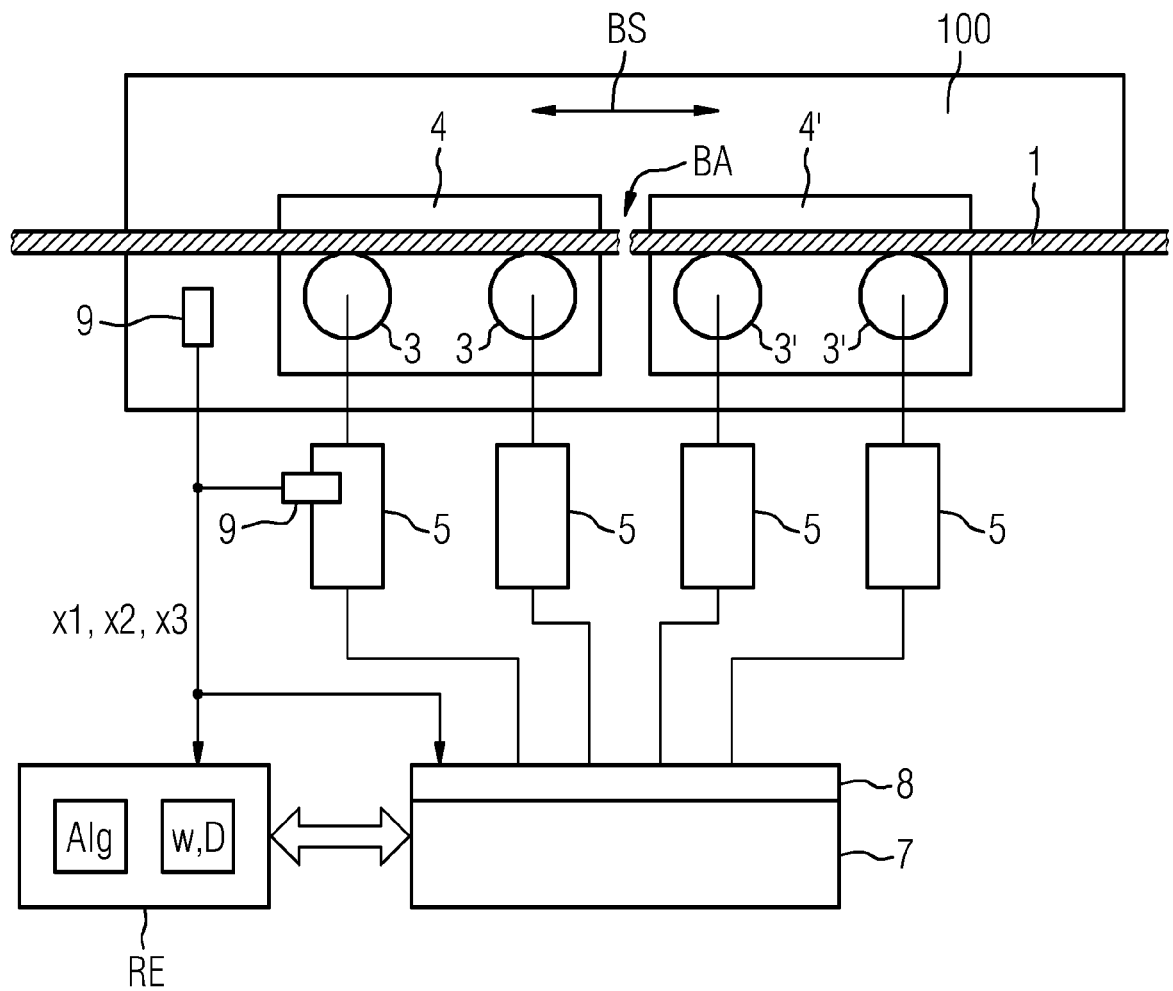
FIG. 1 shows an exemplary industrial installation in accordance with the invention.

FIG. 1 shows an exemplary industrial installation 100. The installation comprises rollers 3, 3', where the rollers 3, 3' are configured for transporting a fibrous material web in particular a paper web. The respective roller 3, 3' is associated, in each case, with a motor 5. The motor 5 serves for rotary movement of the respectively associated roller 3, 3'. Sensors 9 serve to determine the parameters x1, x2, x3, for example, the rotary speed w, the torque D of a roller 3, 3' or the web tension BS of the fibrous material web 1. The respective acquirer 9 can be configured as a detector or a sensor. The acquirer can be associated with a roller 3, 3' or a motor 5.

The industrial installation shown here comprises first rollers 3, where the first rollers are collected together in a first group 4. The industrial installation 100 shown here further comprises second rollers 3', where the second rollers 3' are associated with a second group 4.

Advantageously, the first rollers have, as the parameters x1, x2, x3, substantially the same values. Accordingly, a web break BA of the fibrous material web 1 occurs between respectively adjacent first rollers 3 and second rollers 3'.

The motors 5 are each connected to a power supply 8. The power supply 8 is advantageously configured as a frequency converter. The power supply 8 is coupled to a control facility 7. The control facility serves to control and/or regulate the torques D and the rotary speed w of the respective roller 3, 3'.

The control facility 7 is associated with a computer unit RE. The computer unit comprises an interface for receiving the parameters x1, x2, x3. Advantageously, on the basis of the parameters x1, x2, x3, the rotary speeds w of the respective rollers 3, 3' and/or their torques D are stored in the computer unit RE. Alternatively or additionally, the computer unit RE is associated with a further computer unit. The further computer unit is preferably configured as a cloud and serves for collecting the parameters x1, x2, x3 stored as the time series A, B, C.

Preferably, the learning-capable algorithm A is installed on the computer unit RE. Preferably, a further computer unit serves for teaching the learning-capable algorithm Alg.

The parameters x1, x2, x3 can be torques D, rotary speeds w and/or the web tension BS acquired via sensors 9.

The torque D and/or the rotary speed w is advantageously provided to the power supply for the respective motors.

Parameters x1, x2, x3 can also be control variables and/or regulating variables which, for example, are provided by the control facility 7.

Figure 2:
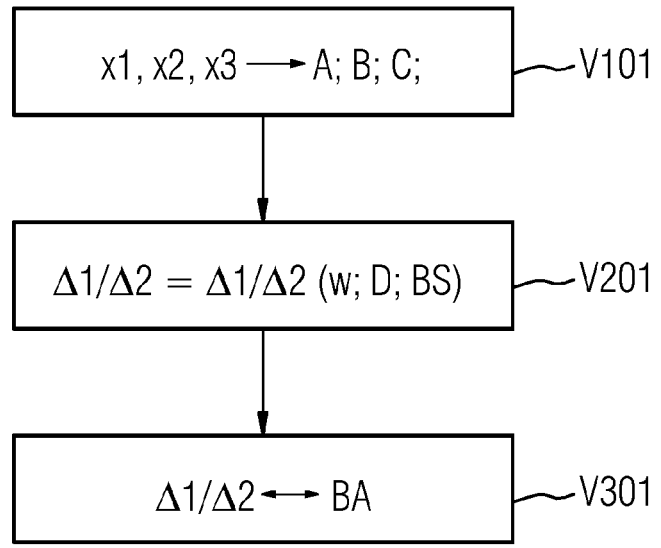
FIG. 2 shows a flowchart of the method in accordance with the invention.

FIG. 2 shows an exemplary method. The exemplary method serves for determining the position of a web break BA of a fibrous material web 1.

In a first step V101, the parameters x1, x2, x3, in particular, the rotary speeds w and the torques D of the respective rollers 3, 3' are acquired. Optionally, the web tension BS is determined based on rotary speeds w of two adjacent rollers 3, 3' in each case. Optionally, the web tension BS or another parameter x1, x2, x3 is stored as a time series A, B, C.

In a second method step V201, the determination of a first deviation Δ1 and/or a second deviation Δ2 is performed. The first deviation Δ1 is determined with the aid of first steps (V102, . . . , V102). The second deviation Δ2 is determined with the aid of second steps (V103, . . . , V603).

Advantageously, the first steps (V102, . . . , V702) and second steps (V103, . . . , V603) occur together in order to determine the position of a web break that has occurred or is imminent.

The first and second deviation Δ1, Δ2 is, for example, a difference of a value of a web tension BS from a mean web tension (BS). The respective deviation Δ1, Δ2 can also be a difference between two rotary speeds w, in particular, a rotary speed w of a first roller 3 from the rotary speed w of a second roller 3'. Alternatively, the deviation Δ can be a difference of torques D of a first roller 3 and a second roller 3'.

In a third method step V301, the determination of the position of the web break BA based on the at least one deviation Δ1, Δ2 advantageously occurs.

The position of the web break BA is preferably displayed to a user with the aid of a display. Advantageously, the display is configured mobile, for example, as a tablet or a handheld device.

Figure 3:
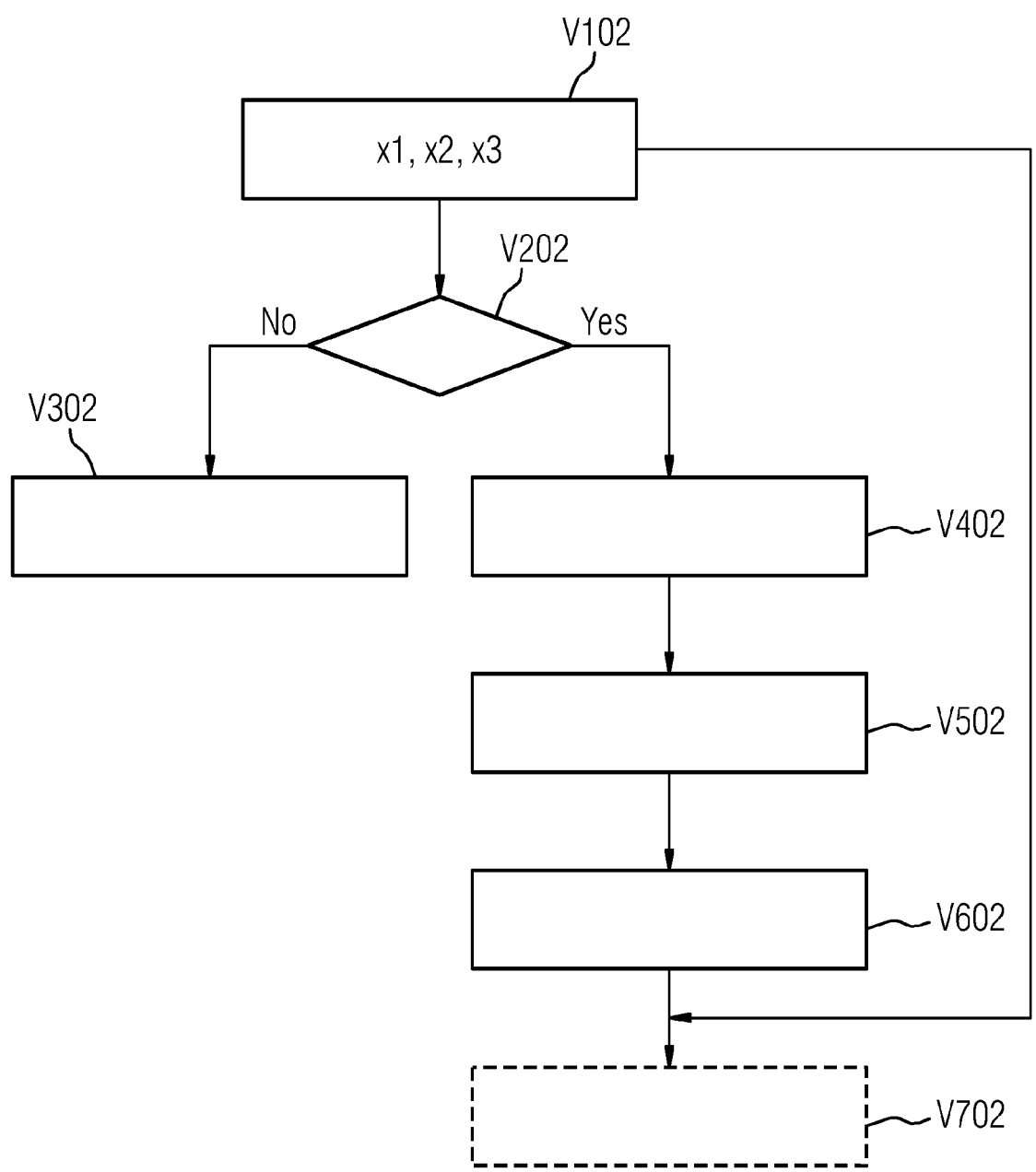
FIG. 3 shows a further flowchart of the method in accordance with an exemplary embodiment of the invention.

FIG. 3 shows a further exemplary method. The further exemplary method preferably serves for predicting the position of a web break BA that has taken place or is imminent.

In the method shown here, first steps (V102, . . . , V102) are performed.

In a first step V102, the parameters x1, x2, x3 are acquired from the industrial installation 100. The acquisition of the parameters x1, x2, x3 advantageously occurs via sensors 9. With the aid of the parameters x1, x2, x3, the movement of each of the rollers 3, 3' in the industrial installation 100 is described. Advantageously, the parameters x1, x2, x3 are stored in the form of time series A, B, C. The storing advantageously occurs in a database that is stored on a further computer unit, in particular a cloud.

In a second step V202, a check is performed to determine whether a parameter x1, x2, x3 has changed ac all. If the parameter x1, x2, x3 has not changed, then a new parameter x1, x2, x3 is selected and checked for a change. This is a test, in particular, of whether the respective parameter x1, x2, x3 corresponds to the specifiable distribution Vert.

The previously selected parameter x1, x2, x3 is discarded in a third step V302.

Alternatively or additionally, in the second step V202 the parameter x1, x2, x3 can be investigated as to whether the respective parameter x1, x2, x3 corresponds to a specifiable distribution, for example, a Gaussian normal distribution. Thus, natural variations of the respective parameter x1, x2, x3 can be taken into account.

On rejection of the respective parameter x1, x2, x3, the investigation of a further parameter x1, x2, x3 occurs with the aid of the second step V202.

In a fourth step V402, the parameters x1, x2, x3 that have changed over time t and/or that do not correspond to the specifiable distribution, are investigated for first deviations Δ1 and the first deviations Δ1 are determined and stored.

In a fifth step V502, a check is performed to determine whether the respective first deviations Δ1 are similar in a plurality of rollers 3, 3' in a group 4, 4'. Herein, the parameters x1, x2, x3 of a first roller 3 are advantageously each compared with the parameters x1, x2, x3 of a second roller 3'.

Alternatively, a check can be performed to determine whether a deviation Δ1 is ascertainable in a plurality of first rollers 3. In the case of a deviation Δ1 with only a first roller 3 or a single second roller 3', typically, a measuring error should be assumed.

In a sixth step V602, on the basis of the first deviations Δ1, it is ascertained with the aid of a learning-capable algorithm Alg, whether a web break BA of the fibrous material web 1 is imminent or has already occurred. Based on an association of the first deviation Δ1 with a roller 3, 3' of the region between two adjacently arranged groups 4, 4', it is possible to determine where a web break BA will occur or has occurred.

In the case of an imminent web break BA, a warning signal is advantageously issued. Advantageously, the expected position of the web break BA is also communicated to the receiver of the warning signal.

Advantageously, the user provides information regarding whether the displayed position of the web break BA was correct and/or whether a web break BA has actually occurred.

In an optional seventh step V702, a teaching of the learning-capable algorithm Alg advantageously occurs. The learning-capable algorithm Alg is caught based on a comparison of the parameters x1, x2, x3 with the web break BA that has occurred. With the teaching, the detection of the web break BA of the learning-capable algorithm Alg can be improved.

Aside from the first deviations Δ1 and the respective position of the web break BA that has occurred or is imminent, the time series A, B, C of the respective parameter x1, x2, x3 are provided. By providing the parameters x1, x2, x3 and, in particular, the position of the web break BA of the fibrous material web 1 that has occurred, the learning-capable algorithm can be taught better and patterns and/or peaks can be more easily detected with a high degree of reliability.

Figure 4:
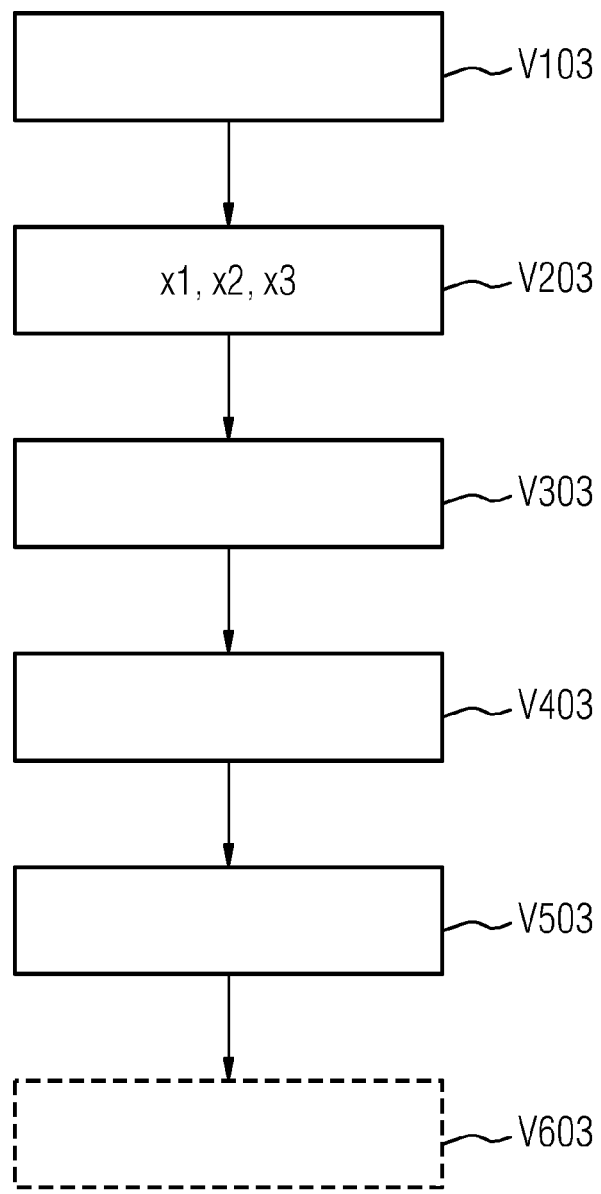
FIG. 4 shows a further flowchart of the method in accordance with an exemplary embodiment of the invention.

FIG. 4 shows a further exemplary method. In this figure, two steps (V103, ..., V603) are shown. In a first step V103, a start signal occurs. The start signal can be the occurrence of a web break BA. Alternatively or additionally, the start signal can represent a regularly repeating time signal.

In a second step V203, a reading-in of the time series A, B, C and therewith of the parameters x1, x2, x3 occurs. The time series A, B, C are typically stored parameters x1, x2, x3 as a function of time t.

In a third step V303, based on parameters provided x1, x2, x3, a determination of the respective web tensions BS of the fibrous material web 1 occurs. The web tension BS is associated in each case with a region of the fibrous material web 1 between two adjacent rollers 3, 3' in each case and/or with a region between two groups 4, 4' of rollers 3, 3'.

Alternatively or additionally, the regions of the fibrous material web 1 in which the web tension BS is severely reduced are determined.

Optionally, time points are determined at which at least one parameter x1, x2, x3 is subject to a significant change.

In a fourth step V403, whether there are time regions dt in which a plurality of parameters x1, x2, x3 show a corresponding behavior pattern is determined.

A behavior is, in particular, the occurrence of a second deviation Δ2, where the second deviation Δ2 is a deviation of the respective parameter x1, x2, x3 from the respective temporal mean <x1>, <x2>, <x3> of the parameter x1, x2, x3. The web tension BS between two rollers 3, 3' each serve as very suitable parameters x1, x2, x3.

Based the behavior pattern, it is possible to ascertain whether and where a web break BA of the fibrous material web 1 has occurred and is imminent.

In a fifth step V503, the indication to a user of the position of the web break BA of the fibrous material web 1 that has occurred or is imminent is provided.

In an optional sixth step V603, the teaching of a learning-capable algorithm Alg based on the position of the web break BA that has been ascertained or is to be expected is performed. Advantageously, a user provides indications as to whether and/or at which position in the industrial installation 100 the web break BA has occurred.

FIG. 5 shows graphical plots of time series A, B, C. A first time series A shows a variation of a parameter x1, x2, x3 as a function of time t. At one time point, a brief rise in the parameter x1, x2, x3 is visible. At no other time region dt does the parameter x1, x2, x3 exceed the specifiable limit value GR. In addition, a specifiable distribution Vert of the parameters x1, x2, x3 is assigned in the respective time series A, B, C. Such a deviation can be a first deviation Δ1.

In particular, if only one single parameter x1, x2, x3, for example, the rotary speed w of a roller 3, 3' or a torque D of a roller 3, 3' goes beyond the limit value GR, in general, a measurement error can be assumed. Advantageously, a taught learning capable algorithm Alg can detect this.

Also shown is a specifiable distribution Vert, according to which the noise of the respective parameter x1, x2, x3 is describable.

The second time series B shows a variation which accords with a web break BA. A linear drift of one parameter x1, x2, x3 is characteristic of a web break BA. A drift can also be non-linear. The drift occurs in the time region dt beyond the limit value GR. The second deviation Δ2 increases during the drift. Such a parameter x1, x2, x3 can be the web tension BS of the fibrous material web 1 between two groups 4, 4'.

In the further course, a fall occurs in the parameter x1, x2, x3 shown here. This fall is a characteristic sign of a web break BA and this behavior is advantageously recognized by a learning-capable algorithm Alg and notified to the user.

The third time series C shows a variation of a parameter x1, x2, x3 over time t. Apart from slight deviations, the respective parameter x1, x2, x3 corresponds to the respective mean value <x1>, <x2>, <x3>.

Summarizing, the invention relates to a method and an apparatus, in particular, for predicting a position of a web break BA of a fibrous material web 1 that has taken place or is imminent. The invention further relates to a computer program product and to an industrial installation 100, in particular a paper-making machine. The method comprises the acquisition of parameters x1, x2, x3, in particular, rotary speeds w of rollers 3, 3' for the transport of the fibrous material web 1 or a web tension BS thereof. Advantageously, the parameters x1, x2, x3 are stored as time series A, B, C. A self-learning algorithm Alg serves to detect the web break BA that is imminent and for determining the position of the web break BA that has occurred and/or is imminent. The basis for the detection or the determination is a deviation Δ of the respective parameter x1, x2, x3, for example, from a temporal mean <x1>, <x2>, <x3> of the respective parameter x1, x2, x3.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining and predicting a position of a web break of a fibrous material web which has occurred or is imminent in an industrial installation having a plurality of rollers, the rollers which are rotatably coupled to a motor transport the fibrous material web in the industrial installation, the method comprising first steps of:
providing and optionally storing parameters, each parameter being associated with at least one roller;
performing a check to determine whether a parameter has a temporal progression which corresponds to a specifiable distribution comprising a normal distribution;
performing a check of a further parameter to determine whether the further parameter has a temporal progression which corresponds to the specifiable distribution, if the temporal progression of a respective parameter corresponds to the specifiable distribution; and
performing a check of the temporal progression of the respective parameter for a first deviation if the temporal progression of the further parameter does not correspond to the specifiable distribution;
the method furthering comprising second steps of:
determining a second deviation of at least one parameter or a temporal change of the respective parameter; and
comparing at least one of (i) the respective parameter and (ii) a respective temporal change of the respective parameter with a specifiable limit value in each case;
wherein the first deviation is at least one of (i) recognized and (ii) associated with at least one roller for the web break of the fibrous material web that has occurred or is imminent aided by a learning-capable algorithm;
wherein the first deviation of the respective parameter is determined with the first steps and the second deviation is determined with the aid of the second steps;
wherein a first position of the web break which is imminent or has occurred is determined aided by the first deviation; and
wherein a second position of the web break which has occurred or is imminent is determined aided by the second deviation, a relevant position being displayed to a user if the first position and second positions match.

2. The method as claimed in claim 1, further comprising: determining the position of the web break aided by visual monitoring, if the first position and the second position of a web break which has occurred are different; and
providing the determined position of the web break which has occurred to the learning-capable algorithm, such that the learning-capable algorithm is improved based on the position of the web break which has occurred.

3. The method as claimed in claim 1, further comprising: determining the position of the web break aided by visual monitoring, if the first position and the second position of a web break which has occurred are different; and
providing the determined position of the web break which has occurred to the learning-capable algorithm, such that the learning-capable algorithm is improved based on the position of the web break which has occurred.

4. The method as claimed in claim 1, further comprising: determining the position of the web break aided by visual monitoring, if the first position and the second position of a web break which has occurred are different; and
providing the determined position of the web break which has occurred to the learning-capable algorithm, such that the learning-capable algorithm is improved based on the position of the web break which has occurred.

5. The method as claimed in claim 1, wherein at least one of (i) the parameters, (ii) the determined position of the web break which has occurred, (iii) the respectively determined first deviation and (iv) the respectively determined second deviation are provided to the learning-capable algorithm.

6. The method as claimed in claim 1, wherein at least one of (i) the first steps and (ii) the second steps are executed repeatedly in a periodic manner to ascertain an imminent web break.

7. The method as claimed in claim 1, wherein at least one of (i) the first steps and (ii) the second steps are executed after the web break has occurred to ascertain the position of the web break which has occurred.

8. The method as claimed in claim 7, wherein the respectively stored parameter is investigated in a time region for a first deviation; and wherein the time region is arranged immediately before the web break which has occurred.

9. The method as claimed in claim 1, wherein the deviation of the relevant parameter is determined based on a difference of the relevant parameter respectively from a temporal mean of the respective parameter.

10. The method as claimed in claim 1, wherein the respective parameter is associated with a plurality of rollers; and wherein the respective parameter maps a movement of respective adjacent rollers.

11. The method as claimed in claim 1, wherein a teaching of the learning-capable algorithm occurs based a comparison of the respective parameter in a time region before a web break that has taken place with the respective parameters in a time region during a normal operation of the industrial installation.

12. The method as claimed in claim 1, wherein the respective parameter comprises at least one of:
a rotary speed or a torque of the respective roller or a motor coupled to the respective roller;
a web tension of the fibrous material web between a first roller and a second roller which are respectively adjacent;
a difference in the rotary speeds of two rollers;
a supply current or a frequency of the supply current of the motor which is coupled to the respective roller; and
a regulating parameter for the respective motor.

13. The method as claimed in claim 1, wherein the first deviation is determined solely after the web break has occurred; and wherein at least one of the first deviation and (ii) the second deviation is determined repeatedly in a periodic manner.

14. The method as claimed in claim 1, wherein at least one first roller is associated with a first group and wherein at least one second roller is associated with a second group;
wherein at least one of:
- at least one of (i) a first deviation and a second deviation of the parameter of the at least one first roller is determined;
- at least one of (i) a first deviation and (ii) a second deviation of the parameter of the at least one second roller is determined; and
- at least one of (i) a first deviation and (ii) a second deviation of the parameter of the at least one first roller from the at least one second roller is determined.

15. An apparatus for determining a web break of a fibrous material web which has occurred or is imminent in an industrial installation, the apparatus comprising:
at least one parameter acquiror, a respective parameter being established to define a movement of at least one roller; and
a display for displaying the web break which has occurred or is imminent;
wherein the apparatus is associated with a computer unit;
wherein the computer unit determines the position of the web break which has occurred or is imminent by first steps of:
providing and optionally storing parameters, each parameter being associated with at least one roller;
performing a check to determine whether a parameter has a temporal progression which corresponds to a specifiable distribution comprising a normal distribution;
performing a check of a further parameter to determine whether the further parameter has a temporal progression which corresponds to the specifiable distribution, if the temporal progression of a respective parameter corresponds to the specifiable distribution;
performing a check of the temporal progression of the respective parameter for a first deviation if the temporal progression of the further parameter does not correspond to the specifiable distribution;
wherein the computer unit determines the position of the web break which has occurred or is imminent by second steps of:
determining a second deviation of at least one parameter or a temporal change of the respective parameter; and
comparing at least one of (i) the respective parameter and (ii) a respective temporal change of the respective parameter with a specifiable limit value in each case;
wherein the first deviation is at least one of (i) recognized and (ii) associated with at least one roller for the web break of the fibrous material web that has occurred or is imminent aided by a learning-capable algorithm;
wherein the first deviation of the respective parameter is determined with the first steps and the second deviation is determined with the aid of the second steps;
wherein a first position of the web break which is imminent or has occurred is determined aided by the first deviation; and
wherein a second position of the web break which has occurred or is imminent is determined aided by the second deviation, a relevant position being displayed to a user if the first position and second positions match.

16. A non-transitory computer-readable medium encoded with program code which, when executed on a computer unit, causes determination and prediction of a position of a web break of a fibrous material web which has occurred or is imminent in an industrial installation having a plurality of rollers, the rollers which are rotatably coupled to a motor transport the fibrous material web in the industrial installation wherein the computer program product is configured, when it runs on a computer unit, the program code comprising;
program code implemented in first steps for:
providing and optionally storing parameters, each parameter being associated with at least one roller;
performing a check to determine whether a parameter has a temporal progression which corresponds to a specifiable distribution comprising a normal distribution;
performing a check of a further parameter to determine whether the further parameter has a temporal progression which corresponds to the specifiable distribution, if the temporal progression of a respective parameter corresponds to the specifiable distribution;
performing a check of the temporal progression of the respective parameter for a first deviation if the temporal progression of the further parameter does not correspond to the specifiable distribution; and
program code implemented in second steps for:
determining a second deviation of at least one parameter or a temporal change of the respective parameter; and
comparing at least one of (i) the respective parameter and (ii) a respective temporal change of the respective parameter with a specifiable limit value in each case;
wherein the first deviation is at least one of (i) recognized and (ii) associated with at least one roller for the web break of the fibrous material web that has occurred or is imminent aided by a learning-capable algorithm;
wherein the first deviation of the respective parameter is determined with the first steps and the second deviation is determined with the aid of the second steps;
wherein a first position of the web break which is imminent or has occurred is determined aided by the first deviation; and
wherein a second position of the web break which has occurred or is imminent is determined aided by the second deviation, a relevant position being displayed to a user if the first position and second positions match.

17. An industrial installation comprising a drying section of a paper-making machine or a paper-making machine, having the apparatus as claimed in claim 15.

* * * * *